United States Patent [19]

Clair et al.

[11] Patent Number: 5,118,489
[45] Date of Patent: Jun. 2, 1992

[54] PRODUCTION OF CONCENTRATED AQUEOUS SOLUTIONS OF FERRIC CHLORIDE

[75] Inventors: Rene Clair, Martigues; Alain Gallet, Lavera, both of France

[73] Assignee: Atochem, France

[21] Appl. No.: 676,467

[22] Filed: Mar. 26, 1991

Related U.S. Application Data

[63] Continuation of Ser. No. 345,242, May 1, 1989, abandoned.

[30] Foreign Application Priority Data

Apr. 29, 1988 [FR] France .................. 88 05799

[51] Int. Cl.⁵ .............................................. C01G 49/10
[52] U.S. Cl. ........................... 423/493; 423/DIG. 1
[58] Field of Search ........................ 423/493, DIG. 1

[56] References Cited

U.S. PATENT DOCUMENTS

| | | | |
|---|---|---|---|
| 1,054,400 | 2/1913 | Dow et al. | 423/493 |
| 2,096,855 | 10/1937 | Ladd | 423/493 |
| 3,873,678 | 3/1975 | McCormack et al. | 423/493 |
| 3,926,614 | 12/1975 | Glaeser | 423/149 |
| 4,066,748 | 1/1978 | Lietard et al. | 423/493 X |

FOREIGN PATENT DOCUMENTS

| | | |
|---|---|---|
| 641141 | 6/1964 | Belgium . |
| 2410629 | 11/1977 | France . |
| 9113798 | 3/1973 | Japan ................... 423/493 |

OTHER PUBLICATIONS

"Concentrated solution of ferric chloride", *Chemical Abstracts*, vol. 82, No. 20, 1975, p. 114, abstract no. 127078e–Nagatoshi et al.
"Ferric chloride solution", *Chemical Abstracts*, vol. 90, No. 24, 1979, p. 139, abstract no. 189260g–Azanza Berrueta.

*Primary Examiner*—John Niebling
*Assistant Examiner*—Brian M. Bolam
*Attorney, Agent, or Firm*—Burns, Doane, Swecker & Mathis

[57] ABSTRACT

Concentrated aqueous solutions of ferric chloride, directly useful as flocculating agents in a variety of water treatments, are prepared by (a) reacting chlorine, advantageously a stoichiometric amount of chlorine, with an aqueous solution of ferrous chloride in the presence of an aqueous solution of ferric chloride, in an essentially vertical reaction zone, with at least a major amount of the ferrous chloride solution being introduced to the upper section of such reaction zone, at least a major amount of the chlorine being introduced countercurrently to the base of such reaction zone, and the ferric chloride solution being introduced at at least one point intermediate such ferrous chloride solution/chlorine inlets, and (b) recovering final product aqueous solution of ferric chloride from the base of the reaction zone.

8 Claims, 1 Drawing Sheet

PRODUCTION OF CONCENTRATED AQUEOUS SOLUTIONS OF FERRIC CHLORIDE

This application is a continuation of application Ser.. No. 07/345,242, filed May 1, 1989 now abandoned.

CROSS-REFERENCE TO COMPANION APPLICATIONS

Our copending applications, Ser. No. 07/672,771 and Ser. No. 07/672,772, both filed concurrently herewith and both assigned to the assignee hereof.

BACKGROUND OF THE INVENTION

1. Field of the Invention

The present invention relates to the preparation of ferric chloride and, more especially, to the preparation of ferric chloride by chlorination of aqueous solutions of ferrous chloride.

2. Description of the Prior Art

Ferric chloride is a known compound which is useful as a flocculating agent in water treatment. Compare, for example, Kirk-Othmer, *Encyclopedia of Chemical Technology*, 3rd edition, volume 24, pages 394–396 (1984) and volume 10, page 498 (1980).

The simplest process for the preparation of ferric chloride entails digesting iron with concentrated hydrochlorine acid; an aqueous solution containing approximately 36% by weight of ferrous chloride ($FeCl_2$) is thus obtained, and this is chlorinated to produce an aqueous solution of ferric chloride ($FeCl_3$) which analyzes by titration at approximately 41% by weight. This 41% solution can be directly employed as a flocculating agent, and is the usual commercial form. A concentrated solution of $FeCl_2$ must be produced, because $FeCl_2$ and $FeCl_3$ can undergo partial hydrolysis during concentration by evaporation, to give HCl. The presence of HCl in $FeCl_3$ is a particular problem in water treatment. The above process also requires the use of concentrated hydrochloric acid.

U.S. Pat. No. 3,682,592 describes a process for producing ferric chloride in which the solution of ferrous chloride is contacted with oxygen.

U.S. Pat. No. 4,066,748 describes a process for preparing ferric chloride beginning with a solution of $FeCl_2$ emanating from a descaling bath. This process requires both a concentration of the ferrous chloride as well as a two-step chlorination.

In Example 3, the '748 patent indicates the impossibility of chlorinating the ferrous chloride completely using the stoichiometric amount of chlorine when using a single reactor, or the requirement to employ an excess of chlorine to chlorinate all of the ferrous chloride.

In carrying out the reaction scheme detailed in Example 4 of the '748 patent, the chlorination of $FeCl_2$ to $FeCl_3$ is reported, but in two reactors, which are charged with a $FeCl_2/FeCl_3$ mixture.

SUMMARY OF THE INVENTION

Accordingly, a major object of the present invention is the provision of an improved process for the preparation of ferric chloride by reacting an aqueous solution of ferrous chloride with a stoichiometric amount of chlorine in a single reactor.

Briefly, the present invention features a process for the synthesis of ferric chloride from ferrous chloride and in the presence of ferric chloride, comprising introducing a major amount of the ferrous chloride aqueous solution at the top of an essentially vertical reactor, introducing a major amount of the chlorine at the base of the reactor, introducing a side stream of ferric chloride solution into the reactor, and recovering an aqueous solution essentially containing ferric chloride from the base of the reactor.

DETAILED DESCRIPTION OF THE PREFERRED EMBODIMENTS OF THE INVENTION

Figure 1:
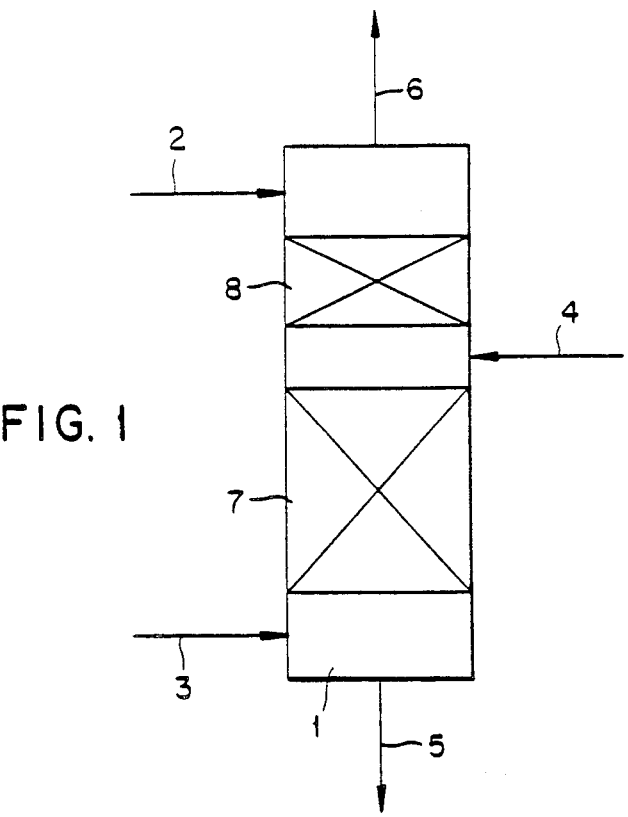
FIG. 1 is a schematic/diagrammatic illustration of one embodiment of the process/apparatus according to the present invention.

More particularly according to the present invention, the reactor ensures that the chlorine and ferrous and ferric chlorides are intimately contacted. The reactor is essentially vertical, that is to say, it is a vessel such that the smallest cylinder containing said vessel has a generatrix at least equal to the diameter of its circular cross-section, which generatrix is either vertical or approximately vertical.

For example, a reactor including a distillation column or an absorption column is employed. A column fitted with contacting means such as blades or packing rings, or with a number of such means, is advantageously employed.

The height of such column may range from 0.1 to 40 meters, and preferably from 2 to 20 meters. The ferrous chloride is in the form of an aqueous solution, as is the ferric chloride. A major amount of the ferrous chloride, namely, at least one-half of the solution, is introduced at the top of the reactor, and the remainder of the solution of ferrous chloride may be introduced at various levels, provided that this is always above the chlorine inlet, which is that inlet closest to the base of the reactor, i.e., geometrically, it is the lowest. The ferrous chloride is advantageously introduced as a single feedstream at the top of the reactor. The ferrous chloride is in the form of an aqueous solution consisting essentially of ferrous chloride, but also capable of already containing ferric chloride and/or hydrochloric acid. Liquid or gaseous chlorine, or a gas or a liquid containing chlorine, may be used. Most of the chlorine, namely, at least half of the feedstream containing the chlorine is introduced at the base of the reactor, and the remainder may be introduced at various levels along the height of the reactor.

The chlorine is advantageously introduced at the base of the reactor.

The inert material present in the chlorine and any unreacted chlorine are collected in the gaseous phase at the top of the reactor.

The reactor is charged with a side stream of ferric chloride. This feedstream is in the form of an aqueous solution essentially consisting of ferric chloride. By "side" is intended that the ferric chloride is introduced at a point intermediate the ferrous chloride feed to the top of the reactor and the chlorine feed at the bottom. It is also within the scope of this invention to use a solution containing up to 1% by weight of ferrous chloride. The ferric chloride may also contain trace amounts of HCl. The ferric chloride may be introduced laterally at a number of points. It is advantageously introduced as a single charge and preferably into the upper third of the reactor.

A ferrous chloride solution and a ferric chloride solution containing not more than 1% by weight of HCl, expressed relative to the weight of the two solutions of ferrous and ferric chloride, are advantageously employed. This makes it possible to directly use the ferric chloride as a flocculating agent for a variety of water treatments.

The reactor advantageously operates at a moderate temperature, namely, at a temperature such that, together with the residence time, hydrolysis of the $FeCl_2$ does not occur.

Although the reaction between the ferrous chloride and the chlorine is complete, a ferrous chloride residence time of at least 10 seconds, and preferably less than 4 hours, is advantageously observed in the reactor.

It is not necessary to chlorinate all of the $FeCl_2$; ferric chloride specifications sometimes permit from 0.1 to 1% by weight of $FeCl_2$ in the ferric chloride solution. The use of an excess of chlorine relative to the stoichiometry is also within the scope of the invention.

The temperature of the reaction medium advantageously ranges from 50° to 100° C. Any particular pressure may be employed; for convenience, the operation is carried out at a pressure of from atmospheric pressure to 6 bars, and preferably from atmospheric pressure to 1 bar gauge.

A solution essentially containing ferric chloride is recovered at the base of the reactor. In a preferred embodiment of the invention, this solution is recycled to the reactor to constitute the side feedstream of ferric chloride. In a static mode, an amount of ferric chloride corresponding, in moles, to the amount of ferrous chloride introduced into the reactor is withdrawn prior to recycling. This withdrawal constitutes the output of ferric chloride. A heat exchanger may also be arranged in the recycle conduit before the return to the reactor, such as to remove the heat energy due to the ferrous chloride chlorination reaction. Some of the water may also be evaporated from the ferric chloride solution exiting the reactor, or from the solution which is withdrawn, or from the solution which is recycled into the reactor, or any combination of these solutions. This evaporation may be carried out using a conventional evaporator or, for example, by a decompression which thus causes the water to be vaporized.

If desired, the ferric chloride solution may be heated prior to evaporation.

In the embodiment shown in FIG. 1 of the drawings, a column 1, which comprises two packed beds 7 and 8, is charged with ferrous chloride via inlet 2, with chlorine via inlet 3 and with ferric chloride via inlet 4. The inerts present in the chlorine feedstream 3 are collected at outlet 6 and a solution of ferric chloride at outlet 5.

Figure 2:
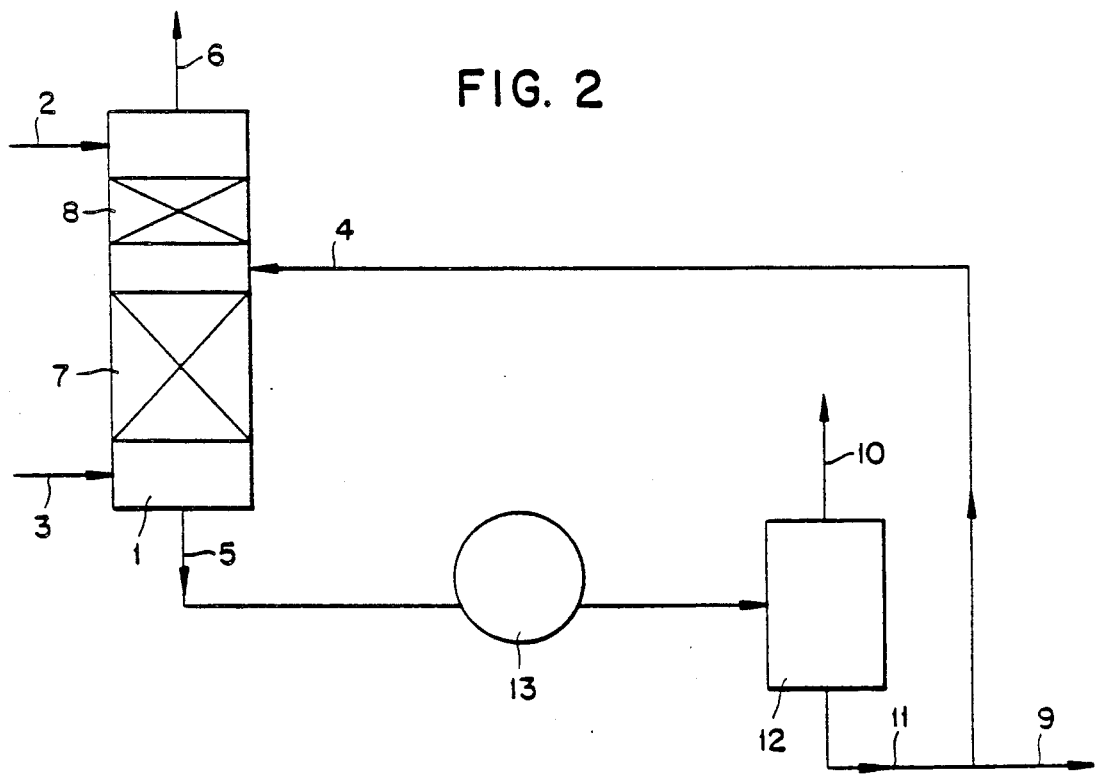
FIG. 2 is a schematic/diagrammatic illustration of another embodiment of the process/apparatus of this invention.

FIG. 2 shows another embodiment of the invention. (the reference numerals employed are the same as in FIG. 1.) The ferric chloride solution in line 5 is decompressed in vessel 12. The outlet liquid phase 11 is divided into a stream 9 which constitutes the final product ferric chloride solution and a stream 4 which is recycled to the reactor 1. The decompression vessel 12 is connected via line 10 to a stream ejector. A heat exchanger 13 is incorporated in the process loop.

In order to further illustrate the present invention and the advantages thereof, the following specific examples are given, it being understood that same are intended only as illustrative and in nowise limitative.

EXAMPLE 1

An apparatus as shown in FIG. 2 was employed, in which the column 1 was constructed of glass, and had an inner diameter of 0.35 m and a packing 7 m in height in respect of section 7 and 3 m in respect of section 8.

A solution of 296 kg/h of $FeCl_2$ and 704 kg/h of water at 80° C. was introduced via inlet 2 and a flow rate of 82.7 kg/h of chlorine and 5 kg/h of inerts via inlet 3. The 5 kg/h of inerts were collected at outlet 6 and a ferric chloride solution, at 85° C., at outlet 5. The column 1 was operated at a pressure of 1.1 bars absolute. The ferric chloride was heated from 85° to 94° C. by the heat exchanger 13 and was then decompressed in vessel 12 to a pressure of 0.25 bars absolute. A solution containing 2,272 kg/h of $FeCl_3$ and 3,269 kg/h of water was recycled through line 4 and 379 kg/h of $FeCl_3$ diluted in 545 kg/h of water were withdrawn through outlet 9.

EXAMPLE 2

Comparative

The procedure of Example 1 was repeated, but the column 1 was charged with ferrous chloride at a point between the two beds 7 and 8, that is to say, at the same height as the recycle 4. To obtain the same conversion of $FeCl_2$ to $FeCl_3$ it was necessary to increase the chlorine flow rate to 88 kg/h, namely, 88 kg/h of chlorine and 5.32 kg/h of inerts. The excess chlorine and the inerts exited the reactor via outlet 6.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of an aqueous solution of ferric chloride in a single reaction zone, comprising (a) reacting chlorine with an aqueous solution of ferrous chloride in the presence of an aqueous solution of ferric chloride, in an essentially vertical reaction zone, with at least a major amount of the ferrous chloride solution being introduced to the upper section of said reaction zone, at least a major amount of the chlorine being introduced countercurrently to the base of said reaction zone, and the ferric chloride solution being introduced at at least one point intermediate such ferrous chloride solution/chlorine inlets, and (b) recovering final product aqeuous solution of ferric chloride from the base of said reaction zone.

2. The process as defined by claim 1, said essentially vertical reaction zone comprising a gas/liquid contactor.

3. The process as defined by claim 1, said ferric chloride solution being introduced to the upper one-third section of said reaction zone.

4. The process as defined by claim 1, said ferrous chloride solution also comprising ferric chloride and/or hydrochloric acid.

5. The process as defined by claim 1, said ferric chloride solution also comprising minor amounts of ferrous chloride and/or hydrochloric acid.

6. The process as defined by claim 1, further comprising recycling a fraction of said final product aqueous solution of ferric chloride as feed for said reaction zone.

7. The process as defined by claim 6, comprising concentrating said final product aqueous solution of ferric chloride prior to recycling same.

8. The process as defined by claim 1, wherein the amount of chlorine introduced into said reaction zone is essentially the stoichiometric amount.

* * * * *